United States Patent
Tourniaire et al.

(10) Patent No.: US 11,446,651 B2
(45) Date of Patent: Sep. 20, 2022

(54) METHOD AND APPARATUS FOR SINGLE PARTICLE DEPOSITION

(71) Applicant: SCIENION GMBH, Berlin (DE)

(72) Inventors: Guilhem Arnaud Tourniaire, Lyons (FR); Ophelie Isabelle Berthuy, Diemoz (FR); Francois Monjaret, Villeurbanne (FR); Joshua Cantlon-Bruce, Spokane, WA (US); Gianluigi Atzeni, Lyons (FR); Illia Glavatskyi, Berlin (DE)

(73) Assignee: Scienion GMBH, Berlin (DE)

( * ) Notice: Subject to any disclaimer, the term of this patent is extended or adjusted under 35 U.S.C. 154(b) by 57 days.

(21) Appl. No.: 16/645,069

(22) PCT Filed: Sep. 7, 2018

(86) PCT No.: PCT/EP2018/074129
§ 371 (c)(1),
(2) Date: Mar. 6, 2020

(87) PCT Pub. No.: WO2019/048607
PCT Pub. Date: Mar. 14, 2019

(65) Prior Publication Data
US 2021/0121871 A1    Apr. 29, 2021

(30) Foreign Application Priority Data
Sep. 7, 2017   (EP) .................... 17189875

(51) Int. Cl.
*B01L 3/02* (2006.01)
*G01N 1/28* (2006.01)
*G01N 35/10* (2006.01)

(52) U.S. Cl.
CPC .......... *B01L 3/0268* (2013.01); *G01N 1/2813* (2013.01); *G01N 35/1016* (2013.01);
(Continued)

(58) Field of Classification Search
CPC ................. B01L 3/0268; B01L 3/0241; B01L 2200/061; B01L 2200/0647;
(Continued)

(56) References Cited

U.S. PATENT DOCUMENTS

| 8,834,793 B2 | 9/2014 | Koltay et al. |
| 11,001,087 B2 * | 5/2021 | Rodriguez ............ B01L 3/0268 |
| 2013/0037623 A1 | 2/2013 | Yamaguchi |

FOREIGN PATENT DOCUMENTS

EP    3222353    9/2017

OTHER PUBLICATIONS

Cheng et al. "Investigation of the Hydrodynamic Response of Cells in Drop on Demand Piezoelectric Inkjet Nozzles", Biofabrication, p. 15008, vol. 8, 2016.

(Continued)

*Primary Examiner* — Brian R Gordon
(74) *Attorney, Agent, or Firm* — Caesar Rivise, PC

(57) ABSTRACT

A method and droplet dispenser for depositing single particles onto a target. For example, a single particle depositing method with improved rate of dispensing single particles and/or increased recovery of rare particles and/or with an extended applicability with different types of particles and/or operation conditions. The depositing method may be capable of increasing the rate of dispensing single cells without decreasing the recovery rate. Testing a single particle condition is combined with testing a zero particle condition and/or the particle type condition. The ejection and sedimentation regions are tested with regard to the presence of a single particle in the ejection, and further particle arrangements allowing a single particle deposition are identified and tested and/or the particle type detection is (Continued)

added to the dispenser control. Accordingly, the speed and recovery rate of dispensing single particles of interest can be improved.

19 Claims, 8 Drawing Sheets

(52) U.S. Cl.
CPC .............. *B01L 2200/0647* (2013.01); *B01L 2300/0663* (2013.01); *B01L 2400/02* (2013.01); *G01N 2035/1034* (2013.01); *G01N 2035/1062* (2013.01)

(58) Field of Classification Search
CPC ........ B01L 2200/0652; G01N 35/1016; G01N 2035/1018
See application file for complete search history.

(56) References Cited

OTHER PUBLICATIONS

Gross et al., "Single-Cell Printer: Automated, On Demand, and Label Free", Journal of Laboratory Automation, vol. 18, No. 6, pp. 504-518, 2013.
Gross et al., "Technologies for Single-Cell Isolation", International Journal of Molecular Sciences, vol. 16, pp. 16897-16919, 2015.
Yusof et al., "Inkjet-Like Printing of Single-Cells", Lab Chip, vol. 11, pp. 2447-2454, 2011.

\* cited by examiner

METHOD AND APPARATUS FOR SINGLE PARTICLE DEPOSITION

CROSS-REFERENCE TO RELATED APPLICATIONS

This application is a U.S. National Phase Application under 35 U.S.C. § 371 of PCT/EP2018/074129, filed Sep. 7, 2018, which claims priority from EP 17189875.2, filed Sep. 7, 2017, the contents of which applications are incorporated herein by reference in their entireties.

BACKGROUND OF THE INVENTION

The invention relates to a method of depositing single particles with a droplet dispenser, e. g. a piezoelectric dispenser, onto a target, in particular to a method of dispensing droplets including particles, wherein droplets including single particles are deposited onto the target if a single particle condition of the droplet dispenser is fulfilled. Furthermore, the invention relates to a dispenser apparatus, being adapted for dispensing droplets including single particles onto a target. Applications of the invention are available in particular in the fields of biochemistry, biology and medicine, e. g. for handling single biological particles, like biological cells.

A plurality of technologies for single-cell isolation, e. g. for handling of single cells in biotechnology and medicine, have been described by A. Gross et al. in "Int. J. Mol. Sci." (2015, 16, 16897-16919), like e. g. flow cytometry, manual cell picking, microfluidic techniques, and inkjet-like single-cell printing. A single-cell printer comprises e. g. a microfluidic dispenser integrated in a polymer cartridge. Droplets of a cell suspension included in the dispenser are deposited on a target substrate. Single-cell printing has advantages in terms of flexibility and easy interfacing with other upstream and downstream methods. However, single-cell printers have to be controlled such that each droplet deposited onto the target includes one single cell only.

Controlling the single-cell printer has been described e. g. by A. Gross et al. in "Journal of Laboratory Automation" (2013, 18(6) 504-518) and by A. Yusof et al. in "Lab Chip" (2011, 11, 2447). An imaging system and automated object recognition algorithms are used for detecting and classifying cells in the microfluidic dispenser chip during dispensing operation and for testing whether a single particle condition of the droplet dispenser is fulfilled. According to A. Gross et al. and A. Yusof et al., the single particle condition is fulfilled if a volume at the dispenser orifice equal to a droplet volume includes one single cell. In this case, a droplet is dispensed to the target, while droplets containing no cell or multiple cells are deflected in flight towards a waste container by vacuum suction.

Practical applications of the conventional techniques of controlling a single-cell printer have the following disadvantages. Firstly, the single-cell printing has a low yield. Despite of using the imaging system and object recognition algorithms, typically only 80% to 85% of droplets deposited onto the target include single cells only. The remaining droplets include more than one cell or no cell. Furthermore, the application of the conventional controlling techniques is restricted to the particular types of dispenser, cell suspension and operation conditions used by the authors of the above publications. Using another dispenser or other materials requires other object recognition and control algorithms.

The hydrodynamic response of cells in piezoelectric nozzles has been characterized by E. Cheng et al. in "Biofabrication", vol. 8, 2016, p. 015008. Cell motion has been studied by high-speed imaging and cell tracking. However, concepts for single-cell printing have not been described by E. Cheng et al.

With a further single-cell printer as described in European patent application No. 16000699.5 (not published on the priority date of the present specification), a modified single particle condition of the droplet dispenser is tested. An ejection region of the nozzle section and a sedimentation region (or: sedimentation layer) adjacent to the ejection region are analysed in a nozzle section image. The ejection region has a size such that particles in the ejection region exit the nozzle section with the next ejected droplet. The sedimentation region is a portion of the nozzle section directly above the ejection region on the upstream side thereof. The size of the sedimentation region is defined such that particles included in the sedimentation region are displaced into the ejection region by sedimentation immediately before the dispensing operation, in particular during a predetermined operation delay interval between the steps of detecting the particles and operating the droplet dispenser. If the ejection region includes one single particle and the sedimentation region is free of particles (or: the sedimentation region includes the suspension fluid only), the single particle condition is fulfilled and a droplet containing a single particle is deposited onto the target. Otherwise, if the ejection region does not include any particles, and/or the sedimentation region includes at least one particle, and/or the ejection region includes multiple particles, the single particle condition is not fulfilled and a droplet is discarded.

Although the technique of European patent application No. 16000699.5 allows an improvement of the yield and reproducibility of dispensing single particles, there may be practical limitations in terms of dispensing speed and/or recovery of rare particles. In particular, testing the single particle condition for each droplet dispensing operation may be time consuming, if the concentration of the particle suspension is low. Furthermore, a droplet can be discarded when a particle of interest is included in both of the ejection region and the sedimentation region. This may result in an undesirable loss of rare particles. As a further disadvantage, the technique of European patent application No. 16000699.5 may have limitations if particle suspensions are to be processed which include different particles types.

SUMMARY OF THE INVENTION

The objective of the invention is to provide an improved method of depositing single particles with a droplet dispenser onto a target, being capable of avoiding disadvantages of conventional techniques. In particular, the objective of the invention is to provide the single particle depositing method with improved rate of dispensing single particles and/or increased recovery of rare particles and/or with an extended applicability with different types of particles and/or operation conditions. Preferably, the depositing method is to be capable of increasing the rate of dispensing single cells without decreasing the recovery rate. Furthermore, the objective of the invention is to provide an improved dispenser apparatus for dispensing single particle droplets onto a target, being capable of avoiding disadvantages of conventional techniques.

The above objectives are correspondingly solved by a method of depositing single particles onto a target and/or a dispenser apparatus for depositing single particles onto a target comprising the features of the independent claims. Advantageous embodiments of the invention are defined in the dependent claims.

According to a first general aspect of the invention, the above objective is solved by a method of depositing single particles with a droplet dispenser onto a target. The droplet dispenser, preferably comprising a piezo-electric dispenser with a Piezo Dispense Capillary (PDC), includes a suspension reservoir, a drive unit and a nozzle section. At least the nozzle section is made of an optically transparent material. Preferably, the nozzle section has an inner shape tapered in downstream direction. The droplet dispenser is capable of dispensing droplets, which have a predetermined first droplet volume (or: regular droplet volume). A particle suspension is loaded to the droplet dispenser, so that the nozzle section and at least a portion of the suspension reservoir is filled with the particle suspension. The particle suspension comprises a liquid, like e. g. water or a physiological salt solution or another encapsulating liquid, and particles of one or multiple type(s), in particular with one or multiple size(s) and/or shape(s).

The presence of particles in the nozzle section is detected, using an imaging device, preferably a nozzle camera being arranged outside the droplet dispenser adjacent to the nozzle section. Detecting the particles preferably comprises imaging the nozzle section, in particular the lower extremity of the PDC, recognizing the particles by image processing and providing the particle positions within the nozzle section image.

The droplet dispenser is controlled based on a test procedure, i.e. the droplet dispenser is controlled in dependency on the result(s) of the test procedure. According to the invention, the test procedure is capable of implementing at least two tests, including testing a single particle condition and at least one of testing a zero particle condition and a particle type condition. Testing the single particle condition can be conducted as described in European patent application No. 16000699.5, which is introduced to the present specification by reference with regard to the details of operating the droplet dispenser and in particular testing the single particle condition. Alternatively, according to an advantageous embodiment of the invention, testing the single particle condition can be modified by dynamically changing the size of the ejection region considered, as outlined below. The droplet dispenser is operated in dependency on the single particle condition, the zero particle condition and/or the particle type condition, wherein one single droplet is dispensed onto the target or at least one droplet is discarded into a collection reservoir, e. g. at least one vessel accommodating the droplets.

With more details, the single particle condition of the droplet dispenser preferably is tested as follows. Preferably, the nozzle section image is subjected to the testing step. A predetermined first ejection region (or: regular ejection region) of the nozzle section and a sedimentation region (or: sedimentation layer) adjacent to the ejection region are analysed. The ejection region is a portion at the downstream end of the nozzle section opening at the nozzle orifice to the surrounding. The size of the ejection region is characterized by the volume thereof or, as the nozzle typically has an axial symmetry, by an axial height thereof. The ejection region has a size such that, when a droplet having the first droplet volume is ejected, particles in the ejection region exit the nozzle section. Preferably, the ejection region is determined by a mapping procedure as outlined below. The sedimentation region is a portion of the nozzle section directly above the ejection region on the upstream side thereof. The size of the sedimentation region, i.e. the volume or axial thickness thereof, is defined such that particles included in the sedimentation region are displaced into the ejection region by sedimentation immediately before the dispensing operation, in particular during a predetermined operation delay interval between the steps of detecting the particles and operating the droplet dispenser.

If the ejection region includes one single particle and the sedimentation region is free of particles (or: the sedimentation region includes the suspension fluid only), the single particle condition is fulfilled. If the ejection region does not include any particles, and/or the sedimentation region includes at least one particle, and/or the ejection region includes multiple particles, the single particle condition tested with the first ejection region is not fulfilled. The droplet dispenser is operated for dispensing droplets. A current droplet is dispensed (or: "printed") onto the target (encapsulation of single particle), if the single particle condition with the first ejection region is fulfilled, i.e. if the first ejection region includes one single particle. The target comprises a substrate, which is adapted for accommodating the droplet with the single particle, e. g. a multi-well plate and/or a microwell plate. Alternative targets comprise e.g. flat surfaces, like microscope slides, or other substrates having any type of cavities or droplet receptacles. Alternatively, if the single particle condition is not fulfilled, optionally after testing the zero particle condition, the current droplet and optionally more droplets is/are dispensed (discarded) into a collection reservoir. Preferably, the collection reservoir is a vessel which is configured for accommodating droplets without or with multiple particles, in particular for discarding or optionally re-using in further process steps.

At least one of the droplet dispenser and the target and the collection reservoir is movable, so that the droplet dispenser and the target can be adjusted relative to each other. Adjusting the droplet dispenser and the target relative to each other for dispensing the single particle droplet requires a predetermined time, i.e. the operation delay interval between the steps of detecting the particles and operating the droplet dispenser for single particle deposition, wherein the operation delay interval depends on the distance between the locations of detecting the particles and single particle deposition and in particular the size of the target and the dispensing position on the target and the speed of mutual movement. Advantageously, the consideration of the sedimentation region in the testing step essentially improves the yield of the single particle deposition.

The zero particle condition of the droplet dispenser is tested by determining whether a predetermined section of the droplet dispenser is free of particles to be dispensed. In other words, the predetermined section includes exclusively the liquid without any particles or, if the particle suspension includes particles of different particle types, without any particle type of interest. The considered section of the droplet dispenser is larger than the first ejection region, and preferably has a volume equal to or larger than the volume of the considered ejection region, multiplied by two. If the zero particle condition is fulfilled, more than one regular droplet, e. g. at least two droplets or a droplet having an increased volume compared with the regular droplet, can be dispensed before next testing the single particle condition. Thus, the operation speed of the dispenser is advantageously increased.

Testing the particle type condition includes determining whether detected particles have a predetermined particle type. The term "particle type" refers to a characterization of particles in terms of a detectable feature thereof, in particular in terms of size, shape, colour, fluorescence emission and/or optical absorption. The particle shape is determined e. g. by at least one particle elongation, particle circularity, particle perimeter, smoothness and granularity. Preferably, the nozzle section image is used for testing the particle type condition. Image processing is applied to the nozzle section image for identifying the type of detected particles.

A further important advantage of the invention results from the broad range of particle types, which are suitable for the application of the inventive single particle deposition method. In particular, the particle may comprise at least one of a biological particle and a synthetic particle. Biological particles may comprise e.g. biological cells, bacteria, microalgae, cell aggregates, cell organelles and/or cell components, like cell nuclei. Synthetic particles may comprise e.g. glass or polymer beads or other microparticles. The particle suspension in the droplet dispenser may include one single type of particles or a mixture of multiple types of particles. All particles may have the same dimension, e.g. cross-sectional size, and shape, e.g. a spherical shape or an elongated shape, or the particles may have a size distribution with a characteristic average dimension and/or different shapes, e.g. irregular shapes. Preferably, the particles have a characteristic dimension of at least 0.2 µm, e. g. at least 2 µm or at least 5 µm, and/or at most 60 µm. The particles may include a marker substance, like e.g. a fluorescing pigment, for facilitating the particle detection in the nozzle section by contrast enhancement. In this case, an irradiation device can be provided for exciting the marker substance.

According to a second general aspect of the invention, the above objective is solved by a dispenser apparatus, which is adapted for dispensing droplets onto a target. The dispenser apparatus comprises at least one droplet dispenser, preferably a PDC, having a suspension reservoir, a drive unit and a nozzle section, being carried by a dispenser head and being controlled by a control device. Furthermore, the dispenser apparatus comprises a nozzle camera being arranged for imaging the nozzle section and for detecting particles in the nozzle section. Preferably, at least one irradiation device, e. g. an LED device, is provided, which is adapted for illuminating the nozzle section, so that the particle detection can be improved. Advantageously, at least one the irradiation device provides a stable and consistent light source adapted to the nozzle camera. Multiple irradiation devices can be provided e. g. for implementing bright filed imaging and fluorescence imaging for particle presence and/or type detection.

The dispenser apparatus includes a control device for controlling the at least one droplet dispenser operation and a testing unit, which is provided in communication with the nozzle camera and with the control device. According to the invention, the testing unit is adapted for testing the single particle condition of the droplet dispenser and at least one of the zero particle condition of the droplet dispenser and the particle type condition. The control device is adapted for operating the droplet dispenser such that in dependency on the single particle condition, the zero particle condition and/or the particle type condition, a droplet is dispensed onto the target or at least one droplet is discarded into a collection reservoir. Preferably, the testing unit includes an image data storage for storing image data, e. g. bright field and fluorescent images, of the ejection region and the sedimentation region and part of the upward dispenser region. Advantageously, the stored image data can be reviewed after particle isolation to verify the single particle isolation performances.

As the main advantage of the invention, testing the single particle condition is combined with testing the zero particle condition and/or the particle type condition. Contrary to the conventional single particle deposition techniques, the ejection and sedimentation regions are tested not only with regard to the presence of a single particle in the ejection, but further particle arrangements allowing a single particle deposition are identified and tested and/or the particle type detection is added to the dispenser control. Accordingly, the speed and recovery rate of dispensing single particles, in particular single particles of interest can be essentially improved.

According to a preferred embodiment of the invention, testing the zero particle condition is conducted if the single particle condition is not fulfilled, i.e. after testing the single particle condition with a current set of nozzle section image data. Testing the zero particle condition preferably includes determining whether an axial length of the droplet dispenser beginning at a tip of the nozzle section and comprising at least the twofold regular ejection region volume is free of particles to be dispensed (i.e. the axial length of the volume equal to or larger than the 2-fold volume of the ejection region beginning at a tip of the nozzle section), wherein the droplet dispenser discards at least two droplets and/or an increased droplet, if the zero particle condition is fulfilled, or discards one droplet, if the zero particle condition is not fulfilled. Advantageously, at least two droplets are discarded before the next step of testing the single particle condition is conducted with new nozzle section image data. If the axial length considered covers a range of the nozzle section accommodating more than the twofold volume of the ejection region, e. g. three, four or more droplet volumes, correspondingly more droplets can be discarded, thus further accelerating the dispenser operation. If there is not any particle in the droplet dispenser, the zero particle condition is fulfilled and the step of operating the droplet dispenser includes discarding a number of droplets equal to the inner volume of the droplet dispenser.

Preferably, if one particle is detected at the axial length of the droplet dispenser and the zero particle condition is fulfilled, a number of droplets is discarded which is required for moving the particle from the position at the axial length to the ejection region. Thus, the chance of dispensing the particle as a single particle in a further dispensing step is advantageously increased.

As a further advantage, multiple embodiments of determining the number of droplets to be discarded are available. According to a first variant, the number of droplets to be discarded is determined by tracking particles in the nozzle section during dispensing droplets in a mapping step, determining an average particle displacement per dispensing step (step of dispensing a regular droplet) and determining the number of droplets to be discarded by dividing the axial length of the nozzle section that is free of particles by the particle displacement per dispensing step. Advantageously, this variant provides a droplet number determination with high precision and reproducibility. According to a second variant, the number of droplets to be discarded is determined by partitioning the nozzle section into droplet regions being numbered according to the number of droplets required for moving the particle from the respective droplet region to the regular ejection region, and determining the number of the droplet region of the detected particle. Advantageously, this variant provides a fast droplet number determination obtained by counting the droplet regions.

According to a particularly preferred embodiment of the invention, the axial length of the nozzle section considered for the zero particle condition test is equal to a field of view of the nozzle camera used for testing the zero particle condition. Accordingly, the maximum viewing range is tested, allowing the determination of a maximum number of the droplets to be discarded.

According to a further preferred embodiment of the invention, the step of testing the single particle condition can be extended if the test is negative with the first ejection region. The extended test of the single particle condition preferably includes reducing a considered size of the ejection region according to an ejection region subsection smaller than the first ejection region and determining whether the current ejection region subsection includes one single particle and the sedimentation region adjacent to the current ejection region subsection is free of particles. The ejection region subsection is also called second ejection region (or, if the size is further reduced as outlined below, third or fourth etc. ejection region). In other words, the step of testing the single particle condition is repeated at least once with the ejection region subsection, wherein a fractional droplet having a fraction of the first droplet volume is dispensed onto the target, if the single particle condition is fulfilled with the current ejection region subsection. The fractional droplet volume is set by operating the droplet dispenser with a reduced driving signal, e. g. a piezo-electric dispenser with an electric driving signal having a reduced amplitude and/or duration. Advantageously, the extended test of the single particle condition allows the dispensing of single particle with increased yield. In particular rare particles can be saved by dispensing the ejection region subsection as a portion of the first ejection region. As an example, if particles accidentally are located in the dispenser such that the first single particle condition step is negative, the particles can be dispensed as single particles by dispensing the ejection region subsection.

If the step of testing the single particle condition with the ejection region subsection is not fulfilled, the droplet having approximately the volume of the second ejection region (i.e. ejection region subsection) can be discarded in the collection reservoir. Alternatively, according to a further advantageous embodiment of the invention, testing the single particle condition can be additionally extended by further reducing the considered size of the current ejection region subsection and testing the single particle condition with the further reduced ejection region subsection. Again, if the single particle condition is fulfilled with the current ejection region subsection, a fractional droplet having a further reduced fraction of the first droplet volume, in practice e. g. approximately a quarter of the first droplet volume, is dispensed onto the target. Otherwise, the droplet corresponding to this subsection volume is discarded or the considered current ejection region subsection is further reduced. Preferably, up to three sizes of the ejection region subsections are considered when testing the single particle condition.

Advantageously, multiple methods of obtaining the fractional droplet volume to be dispensed if the extended single particle condition is fulfilled are available. According to a first variant, the fractional droplet volume is determined based on the particle position in the current ejection region subsection and ejection data collected on a previous mapping step. With the mapping step, a fractional droplet volume is calculated and stored which is required for ejecting particles from any positions in the considered ejection region subsection with one single ejection operation. According to a second variant, the fractional droplet volume can be obtained from a determination of the volume of the considered ejection region subsection.

It is noted that the above embodiments of extending the step of testing the single particle condition by reducing a considered size of the first ejection region according to an ejection region subsection smaller than the first ejection region and determining whether the current ejection region subsection includes one single particle and the sedimentation region adjacent to the current ejection region subsection is free of particles, is considered as an independent subject of the invention. This subject of the invention, which solves the above objective according to a third general aspect of the invention, can be implemented without the steps of testing the zero particle condition and/or the particle type condition. Correspondingly, a dispenser apparatus being configured for implementing the extended steps of testing the single particle condition without the steps of testing the zero particle condition and/or the particle type condition solves the above objective according to a fourth general aspect of the invention.

According to a further advantageous embodiment of the invention, the step of testing the particle type condition includes defining types of particles in the droplet dispenser. Particles types can comprise e. g. to different biological cells or cell components, which can be distinguished e. g by size, shape, colour, fluorescence emission and/or optical absorption, in particular cells carrying a marker substance and cells without the marker substance or undifferentiated cells and differentiated cells. It is tested whether at least one particle type of interest is present in the ejection region (or, with the extended single particle condition test, in the ejection region subsection). This test preferably is conducted using the nozzle camera, wherein at least one nozzle camera image is analysed for identifying the particle type and comparing the identified particle type with particle types of interest. Subsequently, the step of operating the droplet dispenser includes dispensing a droplet with the single particle of interest onto the target or, if the particle is not to be dispensed, discarding a droplet into the collection reservoir.

With an advantageous embodiment (sorting embodiment), the step of testing the particle type condition can be used for sorting particles on the target. If the particles include at least two particle types of interest, e. g. cells carrying different marker substances, the particle type of single particle in the ejection region or ejection region subsection is determined and the droplet including the single particle is deposited at a target position selected in dependency on the particle type of the particle in the ejection region or ejection region subsection. Advantageously, testing the particle type condition introduces the additional sorting function of the single particle dispensing method, providing a gentle processing of particles, e. g. of rare cells. With a preferred example, selecting different target position can include selecting different targets in dependency on the particle type to be dispensed.

With a further advantageous embodiment (enrichment embodiment), the step of testing the particle type condition can be used for dispensing one particle type of interest only, in particular for concentrating particles with the particle type of interest. After testing the particle type condition, including identifying the particle type of a single particle in the ejection region or ejection region subsection, the particle type of interest is dispensed with a single droplet at a target position and other particles are discarded.

In the following, further optional features and advantages of the invention are summarized, which preferably are implemented with at least one of the inventive tests.

In particular, a single particle dispensing system, preferably for a PDC, is proposed which facilitates predictive single particle encapsulation by optical feedback and modelling of individual particle's behaviours within the nozzle section. Through a priori training of the particle's behaviours within the PDC, the optical system can accurately identify single particles which possess a high probability of encapsulation in a proceeding droplet. Once a particle has been identified in the ejection region or ejection region subsection, the testing unit provides feedback to the droplet dispenser and the drive unit thereof to selectively deposit the cell encapsulated droplet while discarding all other remaining droplets.

According to a preferred embodiment of the invention, image data of the ejection region and the sedimentation region are pre-stored in the testing unit. Advantageously, this facilitates conducting the testing step by comparing a current image of the nozzle section during the operation of the dispenser apparatus with the pre-stored image data. The image data may comprise fixed sets of ejection region image data and sedimentation region image data if the dimensions of the ejection region and the sedimentation region do not change during the operation of the dispenser apparatus. Alternatively, the image data may include multiple sets of ejection region image data and/or sedimentation region image data if the dimensions of these sections dynamically change during the operation as a result of changing dispensing conditions.

Preferably, the testing unit is integrated in the control device of the dispenser apparatus. Advantageously, this facilitates the control of the droplet dispenser. Particularly preferred, the testing unit includes an image data storage, which is adapted for accommodating and optionally updating the image data of the ejection region (and/or ejection region subsection) and the sedimentation region, and an image processing unit, which is adapted for a particle recognition.

According to a particularly preferred embodiment of the invention, preparing steps are provided, which are conducted before the operation of the dispenser apparatus for depositing the single particles on the target. The preparing steps include identifying the ejection region (and/or ejection region subsection) and the sedimentation region for the particular dispensing operation to be conducted.

Advantageously, the preparing steps provide an autonomous mapping pre-process including the detection of the particle motion upstream the ejection region. Accordingly, a single particle dispensing platform with increased reliability and minimized false positive droplets is provided. As an advantageous example, test printing was performed using a watery suspension of polystyrene beads having an average diameter of 14.8 µm and a density of 500,000 particles/ml. Imaging of the grid post-printing successfully demonstrated the improved feedback capability of the dispenser apparatus to provide near 100% single particle encapsulation rates. This result was obtained with polymethylmethacrylate beads (diameter 21 µm) and mammalian cells, in particular cancer cells, as well.

Particularly preferred, the preparing steps include a step of mapping the nozzle section, including an identification of the ejection region, and determining, e. g. calculating or measuring (mapping), the sedimentation region on the upstream side of the ejection region. Preferably, the mapping of the nozzle section includes an analysis of the detected particles in the nozzle section such that a travel region and the ejection region are assigned to portions of the nozzle section. The travel region is identified as a portion of the nozzle section, in which the particles are displaced during the dispensing operation of the droplet dispenser, i.e. during activating the drive unit of the droplet dispenser without leaving the nozzle section. On the other hand, the first ejection region is identified as a portion at the orifice of the nozzle section which is left by the particles during the regular operation of the droplet dispenser, and the ejection region subsection is identified as a portion of the first ejection region at the orifice of the nozzle section.

With a particularly preferred implementation of the invention, the mapping step includes a training operation of the droplet dispenser. During the training operation, a series of droplets is dispensed, while the particles are detected and tracked in between each dispensing operation. A first group of particles is identified, which are displaced within the nozzle section during activating the driving unit, and a second group of particles is identified, which are ejected from the nozzle section during the activation of the driving unit. The populated map highlights two distinct regions within the nozzle section. The volumes accommodated by the first and second groups of particles are correspondingly identified as the travel and ejections regions. The training operation is conducted with a particle suspension to be applied in a subsequent single particle deposition process or with a test suspension having equal or similar properties like the particle suspension to be deposited. Alternatively, a previously acquired map can be loaded instead of conducting the mapping step, in particular if a map for the same dispensing conditions, e. g. same dispenser, particles, solutions and parameters, is available.

Determining the sedimentation region preferably includes a calculation resulting in an estimation of those particles, which are displaced from the travel region to the ejection region by the effect of sedimentation during the operation delay interval between the testing and dispensing steps. The sedimentation region is calculated in dependency on parameters of the particle suspension, in particular a viscosity of the suspension fluid, a diameter of the particles and a mass of the particles, and further in dependency on the operation delay interval, in particular on the distance between the position of the droplet dispenser at the collection reservoir and the position of the droplet dispenser at the target, the processing speed of detecting the particles and conducting the testing step, and the speed of moving the droplet dispenser between both positions.

Alternatively, determining the sedimentation region is based on a measurement thereof, including a mapping using an automatic analysis of particle behaviour inside the PDC.

The inventors have found that the volume of the ejection region is not equal to the volume of a droplet dispensed. Firstly, it can be calculated that e.g. for spherical particles with a diameter in a range of about 10 µm to 20 µm, there is an initial lag in the particle's motion relative to the fluid's motion, causing a decoupling of the particles and the fluid displacement during droplet formation. Furthermore, the fluid flow field within the nozzle section during droplet ejection is complex, so that making a reliable model of the volume that would constitute the droplet would be computationally difficult and impractical. Accordingly, the preparing steps, in particular the mapping step represents a further advantageous difference over the conventional techniques. By the direct observation and classification of the particles via the mapping pre-processing step, an accurate model of the nozzle section can be provided without complex calculations.

With more details, the optical feedback algorithm is trained through an autonomous setup procedure which maps out particle behavioural regions of the PDC within the nozzle camera's field of view. This procedure can be performed for every new PDC, printing parameter or cell suspension utilised. Thus, creating a unique map for each new printing operation which allows for a more accurate optical feedback system for single particle encapsulation. During the dispensing operation, the optical feedback system can dynamically update the map if necessary to compensate for any shifts in the printing parameters.

Advantageously, the sedimentation region can be calculated in two different ways. According to a first variant, a single static calculation is conducted, using one single set of parameters of the particle suspension and the operation delay interval. Advantageously, the static calculation saves computational time and reduces the response time of the droplet dispenser. According to a second variant, multiple dynamic calculations of the sedimentation region are conducted, using changing sets of the parameters of the particle suspension and the operation delay interval. As an example, the average diameter of the particles and/or the distance between the droplet dispenser positions at the collection reservoir and the target, in particular a deposition site at the target, can vary. For each set of those parameters another size of the sedimentation region is calculated. Advantageously, the dynamic calculations provide a more accurate model for testing the single particle condition.

According to a further preferred embodiment of the invention, the droplet dispenser is located at the collection reservoir, while the testing step is performed. Droplets are dispensed into the collection reservoir, and particles in the nozzle section are detected and the single particle condition is tested with each dispensing operation. If the single particle condition is fulfilled, i.e. if the ejection region includes one single particle only and the sedimentation region is free of particles (the sedimentation region consists of the fluid only), the droplet dispenser is moved to the target or the target is moved to the droplet dispenser (e.g. to a position between the droplet dispenser and the collection reservoir), and the droplet including the single particle is dispensed onto the target. If the droplet dispenser is moved to the target, this has advantages in terms of applying the invention with an available dispenser apparatus including a moveable dispenser head. Advantageously, all droplets including multiple particles can be discarded or optionally collected in the collection reservoir for a subsequent use.

Preferably, the droplet dispenser is moved with the moveable dispenser head between the collection reservoir and the target. Advantageously, the dispenser head can be provided with a head camera being directed onto the target. The head camera is adapted for collecting images of the target, in particular of the deposition portion of the target so that the dispensing result can be checked. In addition for verifying the presence of a single particle dispensed onto the target, the head camera can be used for an automatic target alignment of the droplet dispenser and an alignment for improved dispensing precision, e. g. in micro-wells.

BRIEF DESCRIPTION OF THE DRAWINGS

Further details and advantages of the invention are described in the following with reference to the attached drawings, which show in.

DETAILED DESCRIPTION OF THE INVENTION

Features of preferred embodiments of the invention are described in the following with exemplary reference to a dispenser apparatus including at least one PDC, like e.g. the apparatus sciFLEXARRAYER (manufacturer: Scienion AG, Germany). It is emphasized that the application of the invention is not restricted to this particular model or PDC-based systems, but rather correspondingly possible with other types of non-contact droplet dispensers, like e.g. solenoid valve controlled dispensers. Furthermore, particular reference is made in the following to the application of the inventive single particle depositing method and the adaptation of the dispenser apparatus for implementing the method. Details of a dispenser apparatus, which are known from conventional systems, are not described. Furthermore, exemplary reference is made to dispensing droplets including single biological cells. The application of the invention is not restricted to dispensing single cells, but correspondingly possible with other biological or non-biological particles.

Figure 1:
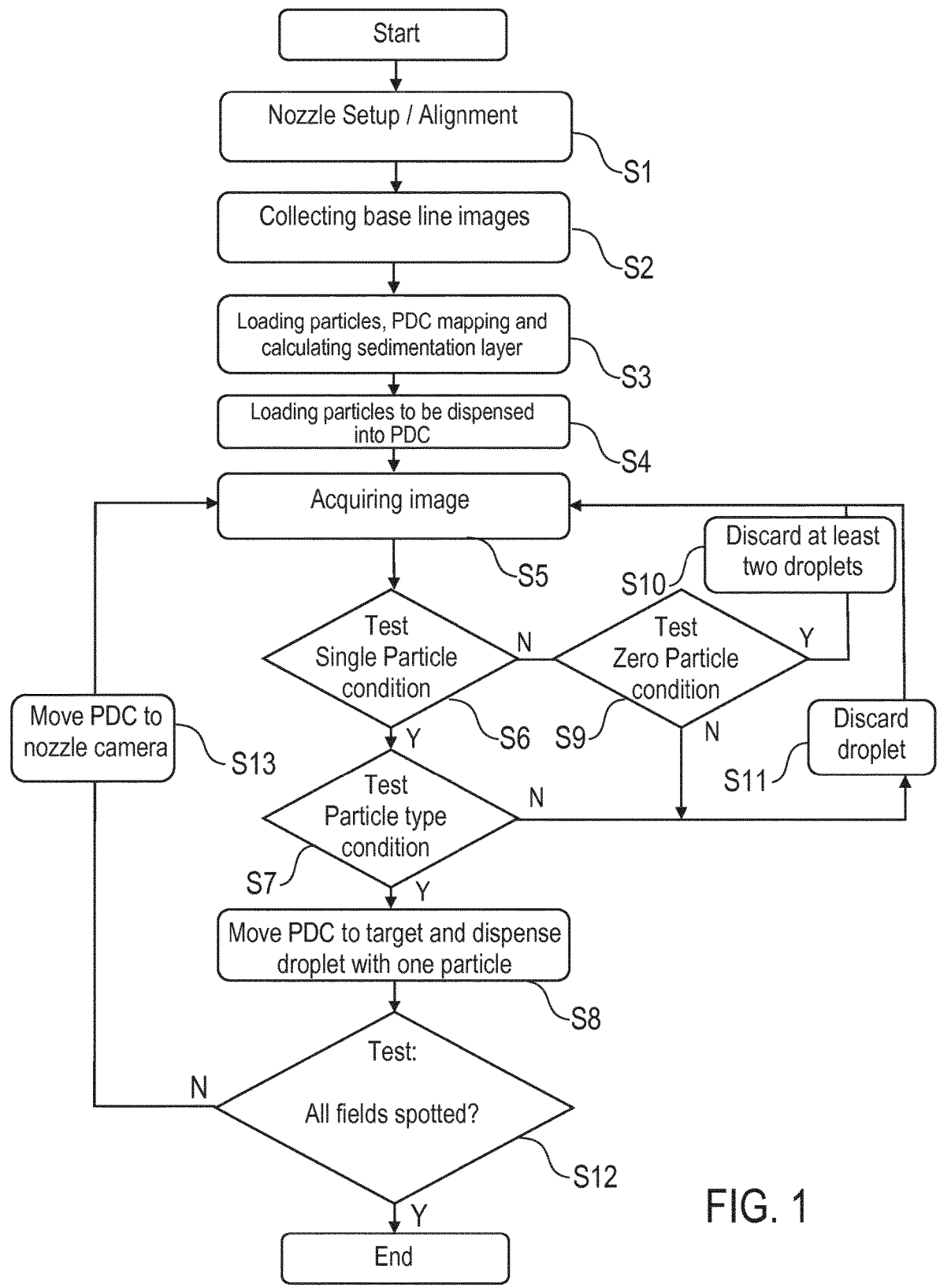
FIG. 1: a flow chart illustrating features of preferred embodiments of the inventive single particle dispensing method.
Figure 4:
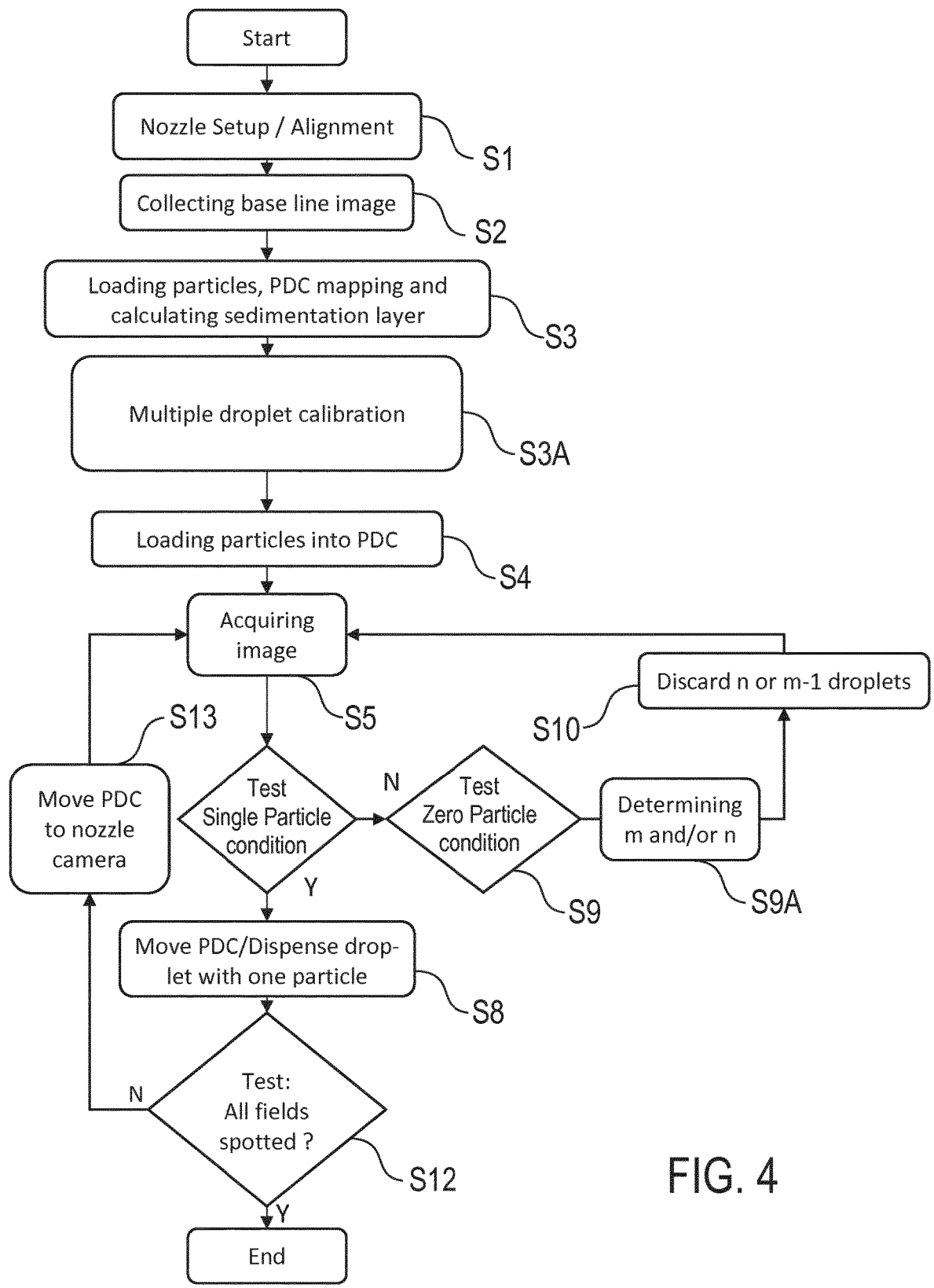
FIG. 4: a flow chart illustrating further details of testing the zero particle condition according to a preferred embodiment of the inventive single particle dispensing method.
Figure 5:
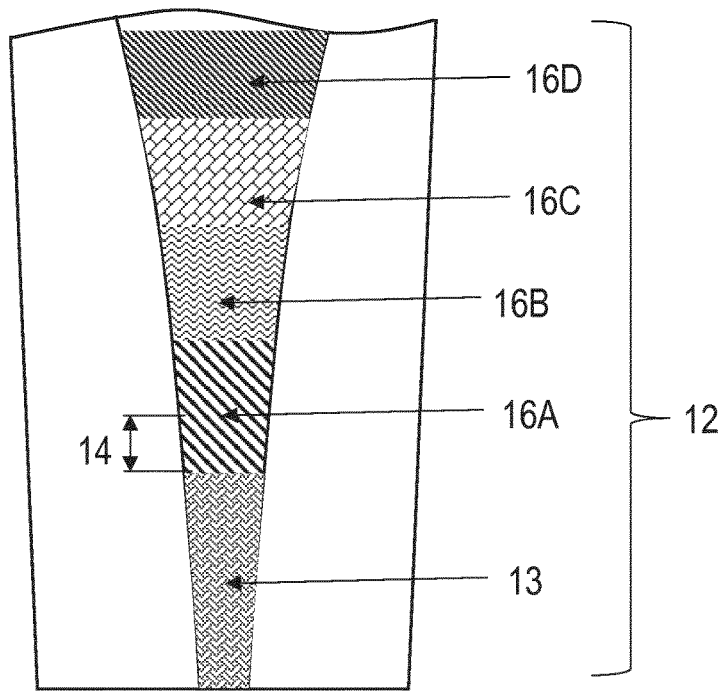
FIG. 5: a schematic cross-sectional illustration of partitioning the nozzle section into numbered droplet regions.
Figure 7:
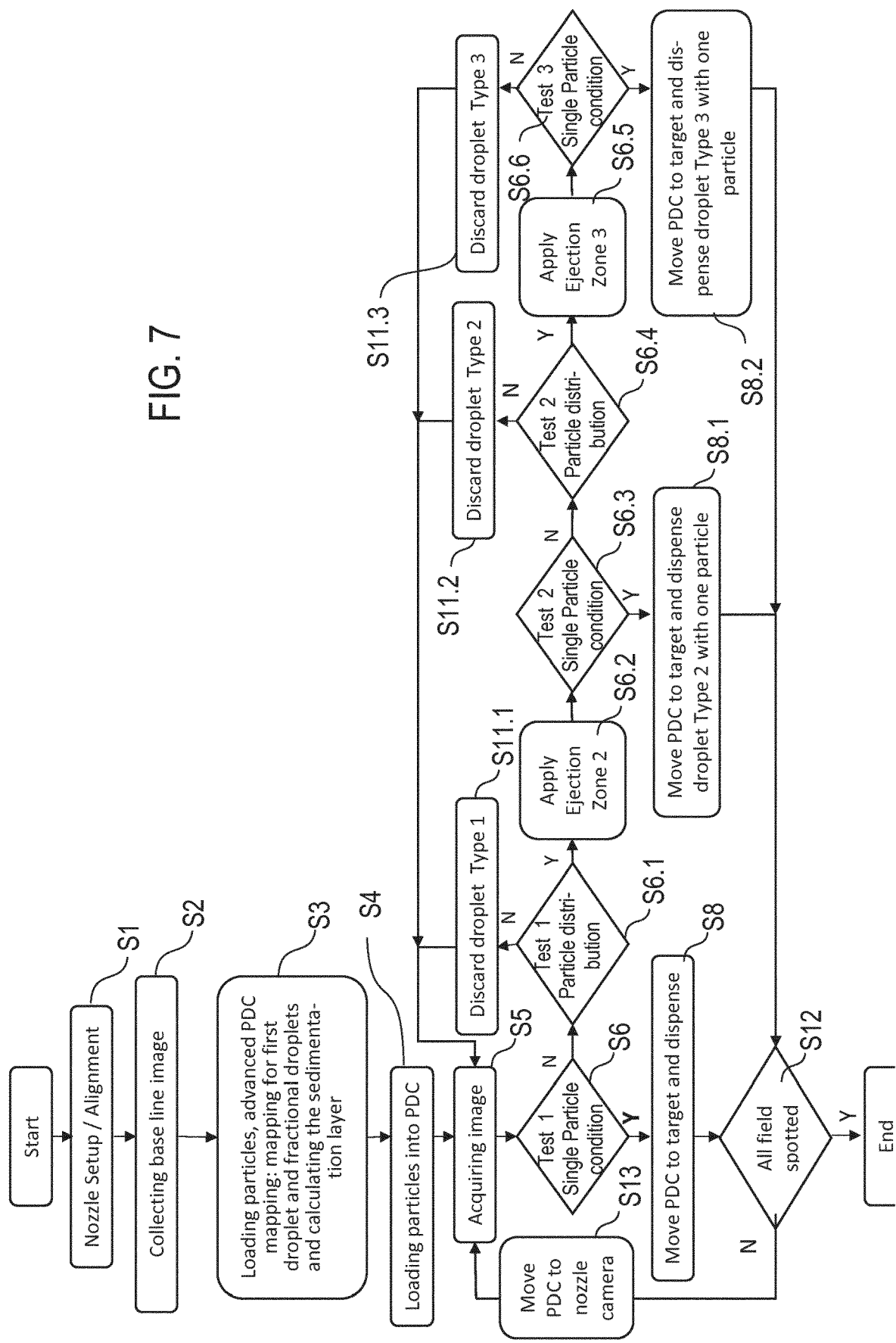
FIG. 7: a flow chart illustrating further details of extended testing the single particle condition according to a preferred embodiment of the inventive single particle dispensing method.
Figure 10:
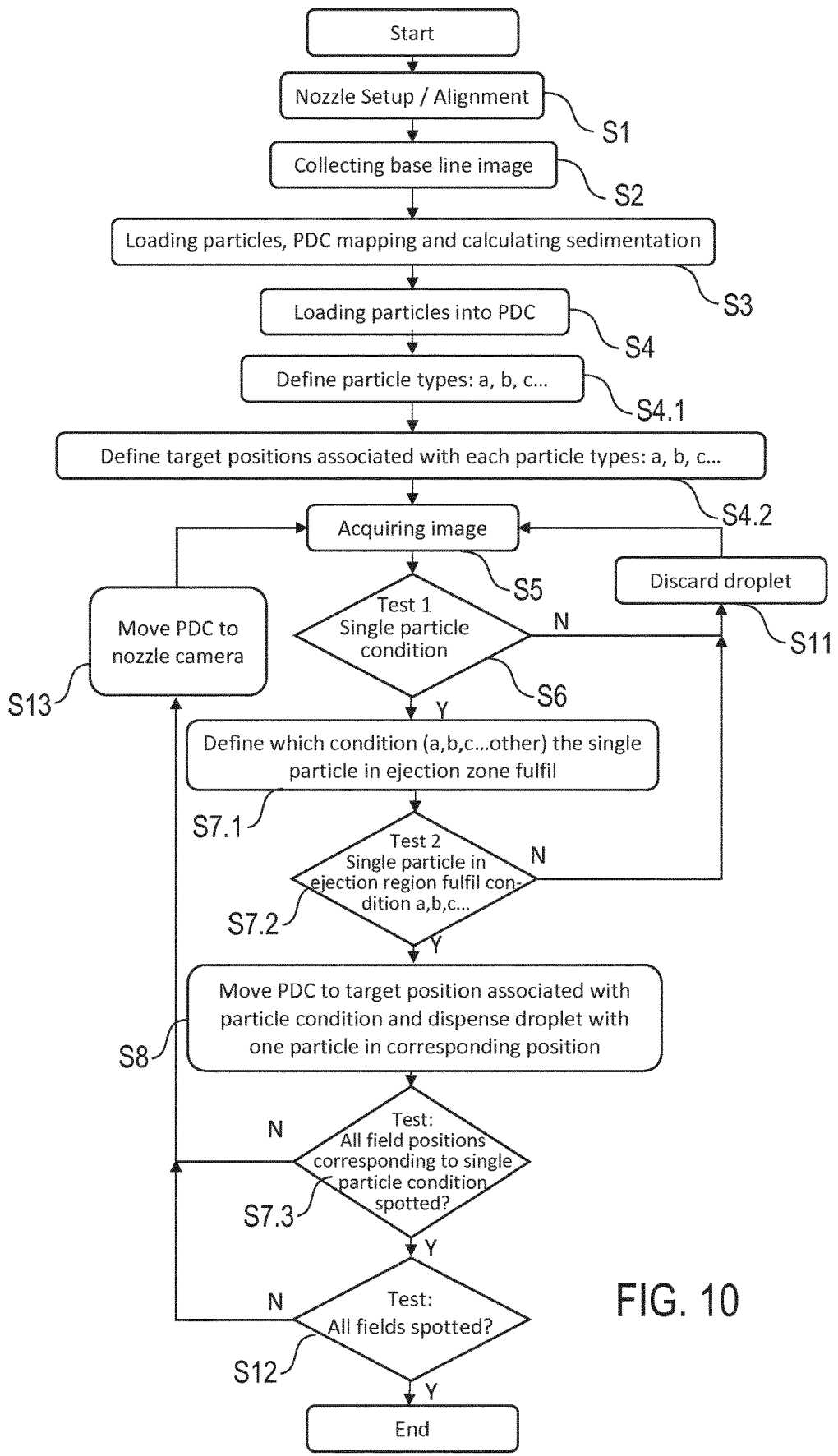
FIG. 10: a flow chart illustrating further details of testing the particle type condition according to a preferred embodiment of the inventive single particle dispensing method.

FIG. 1 illustrates a flow chart representing features of preferred embodiments of the inventive single particle deposition method. The method is illustrated with three tests, including testing the single particle condition (step S6), testing the zero particle condition (step S9) and testing the particle type condition (step S7). The implementation of these tests can be provided in dependency on the requirements of a practical dispensing application. With preferred embodiments, testing the single particle condition (step S6) can be combined with testing the zero particle condition (step S9) only (see FIG. 4), e. g. if there is only one particle type in the suspension liquid. Alternatively, testing the single particle condition (step S6) can be combined with testing the particle type condition (step S7) only, e. g. if the suspension liquid includes a relative high density of particles, so that testing the zero particle condition (step S9) is expected to provide always a negative result. As a further alternative, all tests can be combined as shown in FIG. 1, or only the single particle condition is tested (step S6) in extended manner as shown in FIG. 7. Details of the procedure of FIG. 1 can be modified, e. g. as shown in FIGS. 4, 7 and 10.

According to FIG. 1, after the start of the procedure, a nozzle setup and alignment (step S1) and a step of collecting base line images (step S2) are conducted. With step S1, the droplet dispenser 10 is aligned relative to the collection reservoir 5 and the nozzle camera 30 at the fixed position on the platform 23 (see FIG. 2, described below). Collecting base line images with step S2 includes the collection of images of the nozzle section 12, in particular the ejection region 13 and the downstream end of the travel region 15 thereof (see FIG. 3, described below).

Subsequently, mapping of the nozzle section 12 of the droplet dispenser 10 and calculating the sedimentation region 14 are conducted with step S3. To this end, a portion of the sample to be dispensed or test particles or test beads having similar properties like the particles to be deposited are loaded to the dispenser. The mapping step includes an identification of the ejection and travel regions 13, 15 for the particular sample and dispensing parameters to be used. Multiple dispensing operations are conducted with the particles or test beads loaded to the dispenser. The number of training dispensing operations is dependent on particle concentration and is typically between 100 to 10000 droplets. The sedimentation region 14 is calculated on the basis of one of the above static or dynamic calculation methods.

The ejection and travel regions 13, 15 (see FIG. 3, described below) are identified by tracking and characterization of a number of particles as they pass through the nozzle section 12 during the dispensing operation. As droplets are produced by the droplet dispenser 10, particles within the nozzle section will exhibit one of the following two behaviours: travel or ejection. The mapping step identifies these behaviours and correspondingly localizes the ejection and travel regions 13, 15 within the nozzle section.

The inclusion of the sedimentation region 14 upstream of the ejection region 13 prevents multiple cells from falsely being dispensed as they sediment into the ejection region 13 while the droplet dispenser 10 is in between dispensing routines. The sedimentation region 14 can be a dynamic region which is calculated based on the sedimentation velocity which is a function of the apparent particle size along with the time required for image processing and to move the PDC into position for printing.

Step S3 is performed for every new droplet dispenser 10, dispensing parameters or samples (particle suspension) utilized. Thus, a unique map including the ejection region 13 and at least one sedimentation region 14 (each for one particle type) is created for each new dispensing operation, which is used in the subsequent optical feedback test for single particle encapsulation.

Once trained, the particle dispensing operation can commence with the particles, e. g. cells to be dispensed. The droplet dispenser 10 is positioned in front of the optical system where each individual particle within the droplet dispenser 10 is identified and tracked in real time. For single particle encapsulation, the optical feedback system will selectively identify single particles for printing while accounting for the potential effects which particles upstream of the nozzle may have on the encapsulation outcome.

The practical operation of the dispenser apparatus 100 for depositing single particles on the target 2 starts with step S4 (FIG. 1), wherein the particle suspension is loaded into the droplet dispenser 10. The droplet dispenser 10 is aligned relative to the collection reservoir 5 and the nozzle camera 30 (see FIG. 2). The droplet dispenser 10 is positioned in front of the nozzle camera 30, which acquires an image of the nozzle section with step S5. The acquired image is aligned with the base line image collected with step S2, and the presence of particles within the nozzle section 12 is detected. Each individual particle within the nozzle section 12 is identified and tracked in real time.

With step S6, the single particle condition of the droplet dispenser 10 is tested as described in European patent application No. 16000699.5 or in extended manner as described below with reference to FIG. 7. For instance, according to European patent application No. 16000699.5, the acquired image of step S5 is examined for testing whether no particles are located in the sedimentation region 14 and one single particle is located in the ejection region 13 (see FIG. 3).

Advantageously, the inclusion of the sedimentation region 14 upstream of the ejection region 13 prevents multiple particles from falsely being dispensed as they sediment into the ejection region 13 while the droplet dispenser 10 is in between dispensing routines. During the dispensing operation, the optical feedback system can dynamically update the map, in particular the identification of the ejection region 13 if necessary to compensate for any shifts in the dispensing parameters, e.g. shifts in droplet volume.

The sedimentation region 14 (see FIG. 3) can be modelled as static or dynamic region as mentioned above. The dynamic sedimentation region can be calculated based on the expected sedimentation distance of each identified particle to account for the inherent polydisperse particle size range. This may be important as the sedimentation velocity has an exponential relationship with the particle diameter D. Alternatively, the static sedimentation region 14 would be utilized if a preset approximation of the maximum sedimentation distance expected within the droplet dispenser 10 would be sufficient for the particular deposition task.

If testing the single particle condition is negative, e. g. if no or multiple particles are present within the ejection region 13, the step of testing the multiple particle condition (step S9) is conducted (see FIG. 4), resulting in discarding at least two droplets (step S10) or one droplet (step S11). Alternatively, step S9 can be omitted, and the current droplet considered is directly discarded with step S11 by operating the droplet dispenser at the collection reservoir 5. After steps S10 or S11, the next image is acquired with step S5, followed by another test with step S6.

If testing the single particle condition (step S6) is positive, the particle type condition can be tested with step S7, as described below with reference to FIG. 10. Subsequently, if a particle having a type of interest is detected, the droplet dispenser 10 is moved to the target 2, and a droplet including the single particle is deposited on the target 2 with step S8. Otherwise, a droplet is discarded (step S11).

After step S8, another test can be conducted with step S12, wherein it is tested whether all fields on the target 2 are spotted, e.g. by analysing a camera image of the target or using recorded position data of droplets dispensed during previous operation. If yes, the procedure stops. If not, the droplet dispenser 10 is moved again to the collection reservoir 5 and the nozzle camera 30 (step S13) for acquiring the next image with step S5.

Advantageously, the optical feedback system of the invention enhanced by the mapping pre-process and the consideration of the upstream particle's motions in the sedimentation region 14 allows for a reliable single particle dispensing platform with minimized false positive droplets. A test printing was performed using heterogeneous primary lung cancer cells suspended at 100.000 cells/ml. Imaging of the grid post-dispensing in experimental tests shows that each droplet at one of 100 dispensing positions on the target encapsulated one single cell.

Figure 2:
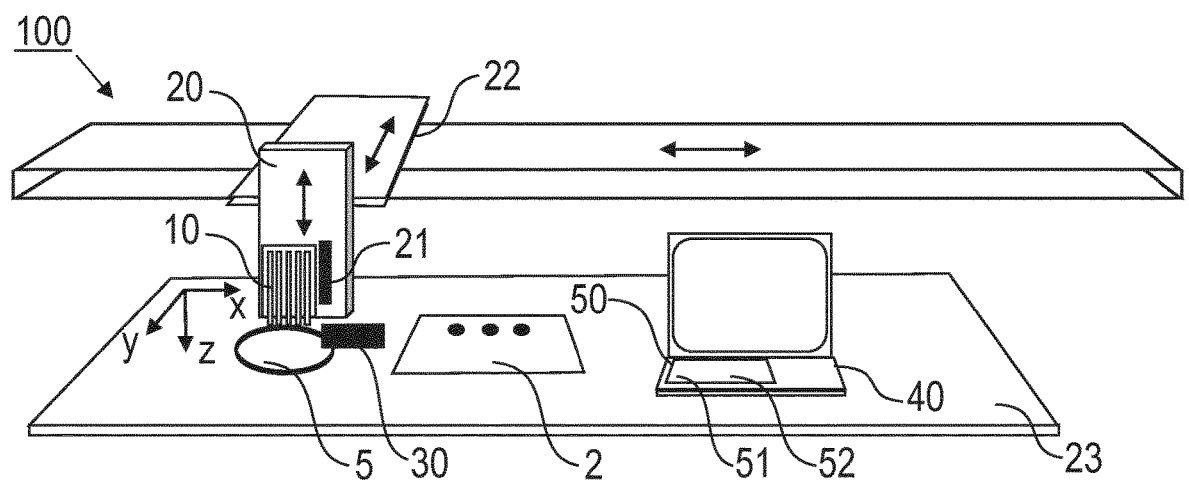
FIG. 2: a schematic view of features of a dispenser apparatus according to preferred embodiments of the invention.

FIG. 2 schematically illustrates a preferred embodiment of a dispenser apparatus 100, which is adapted for dispensing droplets including single particles, like single biological cells, onto a target 2. The dispenser apparatus 100 comprises at least one droplet dispenser 10, which is attached to a dispenser head 20. With practical examples, one single droplet dispenser 10 or a line or matrix array of droplet dispensers 10 can be provided.

The at least one droplet dispenser 10 is a PDC, including a suspension reservoir 11 and a nozzle section 12 (see FIG. 3) as well as a piezo-electrically activated drive unit (not shown). With more details, the droplet dispenser 10 is composed of a glass capillary connected to a syringe pump (not shown) for sample loading and washing between different samples. The drive unit includes a piezo-ceramic element positioned around the glass capillary. By applying a control voltage to the piezo-ceramic element, a dispensing operation of the droplet dispenser is triggered.

The dispenser head 20 onto which the droplet dispenser 10 is mounted is moveable with a translation stage 22. The translation stage 22 is adapted for translations of the dispenser head 20 in all three spatial directions (x-, y- and z-directions). The target 2 and a collection reservoir 5 are arranged in the operation range of the translation stage 22, e.g. on the common platform 23. The position of the dispenser head 20, i.e. the position where droplets are dispensed, is controlled via the movement of the dispenser head 20 using the translation stage 22 over the platform 23, in particular to the target 2 or the collection reservoir 5. Alternatively, the at least one dispenser 10 can be arranged with a fixed position, while the target 2 is mounted on a translation stage for adjusting the target position relative to the droplet dispenser position. According to another alternative, both of the at least one dispenser 10 and the target 2 can be moveable with translation stages being adapted for translations along the three or less spatial directions.

A head camera 21 is mounted on the dispenser head 20. It can be coupled to a range of different light sources (not shown). The head camera 21 is adapted for both of the alignments of the target 2 and the droplet dispenser 10 relative to each other and for quality control of the deposition result. To this end, the head camera 21 is coupled with the control device 40 running an image analysis software, like "Online Array QC". After the droplet deposition on the target 2, the head camera 21 can be used for visualizing the printed droplets 4 including the single particles 1. If necessary, the head camera 21 is used for identifying the number of particles present at the different deposition positions. Optionally, a fluorescence exciting light source can be used for illuminating the target, so that particles carrying a marker substance, e.g. fluorescently labelled cells, can be visualized and detected.

The dispenser apparatus 100 is adapted for conducting the detecting and testing steps with the at least one droplet dispenser 10 according to FIG. 1, while it is operated at the collection reservoir 5. A nozzle camera 30 is placed over the platform 23 adjacent to the droplet dispenser 10 under consideration such that the nozzle section of the at least one droplet dispenser 10 can be imaged and particles in the nozzle section can be detected with the nozzle camera 30. Optionally, a light source (not shown) can be arranged for illuminating the droplet dispenser 10. As an example, a UV light source can be used for illuminating the nozzle section 12, so that the detection of e.g. the fluorescently labelled cells can be improved.

The nozzle camera 30, like e.g. the camera IDS UI3240CP, is provided with a CCD-based device and a camera optic, and it is configured for imaging the nozzle section 12 and further for a visualization and monitoring of the drop formation prior to dispensing. As an example, the nozzle camera 30 is adapted for detecting particles in the nozzle section of the droplet dispenser 10 over an axial length of e.g. 700 μm to 800 μm. The nozzle camera 30 is connected with the control device 40 including the image processing unit 52. Using the location information on the particles and the a priori knowledge of the particle behaviour within the nozzle section 12, the single particle condition of the droplet dispenser can be analysed as outlined below.

If multiple droplet dispensers are provided, the nozzle camera 30 is arranged for collecting images of all droplet dispensers. Alternatively, multiple nozzle cameras can be provided for collecting images of single droplet dispensers or groups of droplet dispensers, or one nozzle camera can be adjusted relative to one of the droplet dispensers.

Furthermore, the dispenser apparatus 100 includes a control device 40, which is arranged for controlling the operation of the at least one droplet dispenser 10. To this end, the control device 40 comprises a computer circuitry which is connected with the drive unit of the at least one droplet dispenser 10 and the translation stage 22 as well as the nozzle and head cameras 30, 21. The control device 40 includes a testing unit 50, which is adapted for testing the single particle condition of the at least one droplet dispenser 10. To this end, the testing unit 50 is coupled with the nozzle camera 30 and provided with an image data storage 51 storing image data of the at least one droplet dispenser 10 and with an image processing unit 52, which identifies the presence and location of any particle within the nozzle section of the at least one droplet dispenser 10.

Figure 3:
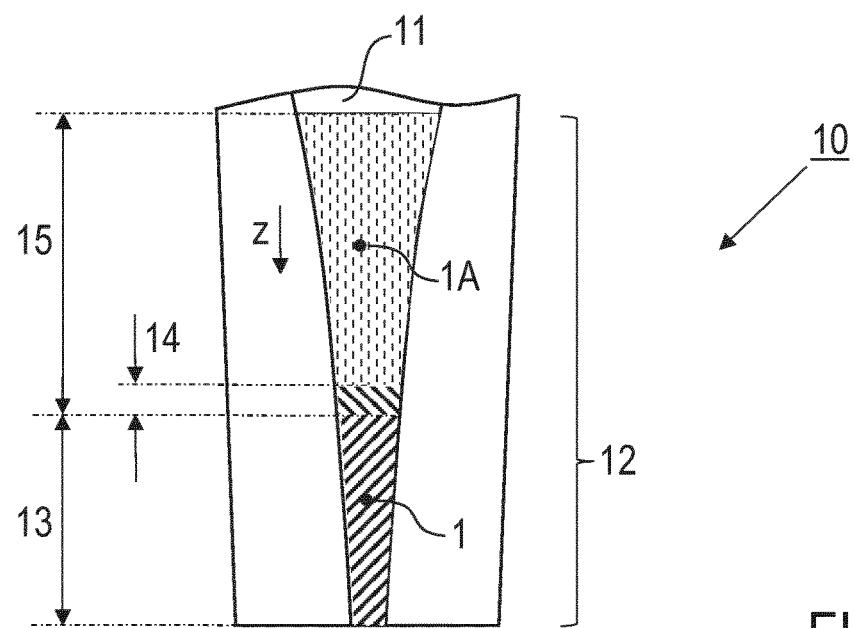
FIG. 3: a schematic cross-sectional view of a nozzle section with an illustration of an ejection region, a sedimentation region and a travel region.

FIG. 3 schematically illustrates the downstream end of a droplet dispenser 10, including the suspension reservoir 11 (partially shown) and the nozzle section 12. The droplet dispenser 10 comprises e.g. a glass capillary with an inner diameter of about 40 μm to 90 μm. The nozzle section 12 includes the ejection region 13 and the travel region 15, which are identified in preparing steps by the particle behaviour during the dispensing operation. The regular ejection region 13 is identified as the volume, which covers all positions of particles, which are ejected during a single dispensing operation with a regular droplet volume. If a fractional droplet with a reduced volume is to be dispensed (see FIG. 7), the ejection region 13 is identified as the volume, which covers all positions of particles, which are ejected during a single dispensing operation with the fractional droplet volume. The travel region 15 is identified as covering all positions of particles, which are displaced during a single dispensing operation, while being kept within the droplet dispenser 10.

The particles are displaced during the dispensing operation due to the movement of the liquid within the nozzle section 12. Additionally, particles are displaced due to sedimentation everywhere inside the dispenser, in particular from the travel region 15 to the ejection region 13. Accordingly, a sedimentation region 14 is defined, which is the downstream section of the travel region 15. The sedimentation region 14 covers all positions of particles, which can be displaced by the effect of gravity during the time interval between the particle detection and the dispensing operation, including a duration of the movement of the droplet dispenser 10 from the collection reservoir 5 to the target 2. The sedimentation region 14 does not depend on the droplet volume to be ejected, i.e. it is equal for the regular or reduced ejection volumes.

The volume of the sedimentation region 14, in particular the height in axial direction of the droplet dispenser 10 is calculated on the basis of the following considerations. The sedimentation velocity (v) of a particle is driven by gravity, and it can be calculated by:

$$v = \frac{(\rho_p - \rho_f)gD^2}{18\mu}$$

wherein $\rho_p$ is the mass density of the particle, $\rho_f$ is the mass density of the fluid, g is the gravitational acceleration, D is the dimension, e.g. diameter of the particle and $\mu$ is the dynamic viscosity of the fluid.

The displacement distance is calculated by the product of the sedimentation velocity and the time required for the dispenser apparatus 100 to test the single particle condition and to move the droplet dispenser 10 to the target 2. In practice, the time for testing the single particle condition is negligible compared with the movement time, which is provided by the dispenser apparatus 10, in particular the speed of the translation stage 22.

Typically, the particle mass density is larger than the liquid mass density, so that all particles within the nozzle section 12 will sediment over time. Only particles near the upstream boundary of the ejection region 13 within the sedimentation region 14 are critical for the consideration of the single particle condition. Accordingly, the sedimentation region 14 is always adjacent to the ejection region/travel region boundary.

The size of the sedimentation region 14 can be calculated in a static or in a dynamic way as follows.

For the static calculation, the variables in the above equation are generalized by taking an average particle diameter and the maximum time required for the dispenser apparatus 100 to reach a desired target 2. Accordingly, one fixed sedimentation region 14 is determined.

With a practical example of a cell suspension, the values are as follows: $\rho_p$=1068 kg/m$^3$, $\rho_f$=1000 kg/m$^3$, g=9.8 m/s$^2$, and μ=1 mPa s. An average cell diameter of D=18 μm and a duration for moving the droplet dispenser 10 to the target 2 of 5 s would yield a thickness of the sedimentation region of about 60 μm. With another example, if the duration of moving the droplet dispenser 10 to the target 2 is typically less than 2 s, the thickness of the sedimentation region typically is less than 25 μm. The above calculation has been done on the assumption that the particles do not contact the inner wall of the PDC channel. This approach is fulfilled in practice.

For the dynamic calculation, the values of $\rho_p$, $\rho_f$, g and μ are assumed to be constant. However, the diameter D and the time to target 2 are variables. The time to target 2 can be provided by the dispenser apparatus 100 as the desired target locations are predefined before the dispensing operation. The diameters D can be estimated by the apparent diameter of the particles as identified with the nozzle camera 30. Accordingly, different dimensions of the sedimentation region 14 are obtained for different diameters D and time to target 2 values. Accordingly, for each particle outside the ejection region 13 and within the field of view of the nozzle camera 30, a unique sedimentation region 14 can be determined. Advantageously, this results in a more robust consideration of the single particle condition, especially for particle samples, which have wide particle size distributions. As there is a $D^2$ relation to the sedimentation velocity, a particle of e. g. 12 μm will only have a sedimentation velocity of 5.3 μm/s, while a particle of e. g. 18 μm will have a corresponding sedimentation velocity of 11.9 μm/s.

FIG. 3 illustrates an example of a distribution of two particles 1, 1A in the nozzle section 12, providing a positive test of the single particle condition (step S6). The ejection region 13 includes one single particle only, while the sedimentation region 14 is free of particles. The second particle 1A is detected in the travel region 15, i.e. at a position where it cannot sediment into the ejection region 13 during moving the droplet dispenser 10 to the target 2.

FIG. 4 shows a flow chart illustrating further details of testing the zero particle condition. Steps S1 to S6, S8, S12 and S13 are conducted as described above with reference to FIG. 1. Step S11 is not shown in FIG. 4, but can be implemented like in FIG. 1. Additionally, a multiple droplet calibration (step S3A) is conducted, which is used for implementing the zero particle condition test of step S9.

The multiple droplet calibration step 3A may include at least one of the following examinations. Firstly, it can be counted how many droplets (number m) having the regular droplet volume can be generated to displace a particle from one extremity of the field of view, e. g. in an upper zone of the travel region 15 (see FIG. 3) to the other, e. g. in the ejection region 13, preferably just to the tip of the nozzle. Secondly, it can be estimated, how many droplets (number n) are to be dispensed to move a particle from any position, in particular z-position, in the nozzle section 12 to the ejection region 13. Number m and n are stored in the testing unit 50 (see FIG. 2).

Step S9 of testing the zero particle condition includes testing whether an axial length of the droplet dispenser 10 beginning at the tip of the nozzle section 12 is free of particles. If the zero particle condition is not fulfilled, e. g. when no particle is located in the ejection region 13, but one particle is located in the sedimentation region 14 and multiple particles are located in the travel region 15, one droplet is discarded (step S11 in FIG. 1, not shown in FIG. 4). If the zero particle condition is fulfilled, e. g. there are no particles in the ejection and sedimentation regions, 13, 14, but one particle is located in the travel region 15, the number of droplets to be discarded is determined (step S9A) by at least one of the following methods. Firstly, it can be determined, if a particle is detected in dispenser 10, how far from tip of dispenser 10 is it arranged. Based on the multiple droplet calibration step 3A, it is deduced how many droplets (n, number of shifting steps) can be dispensed to move it to the ejection region. Secondly, it can be determined, if no particle is present in dispenser 10, it is deduced how many droplets (m, number of emptying steps) can be dispensed to discharge the current dispenser contents from the field of view. Accordingly, (m−1) droplets could be dispensed, in order to discard the current dispenser content. Subsequently, n or (m−1) droplets are discarded to the collection reservoir (step S10).

FIG. 5 shows a variant of determining (step S9A) the number m of emptying steps. The schematic cross-sectional view of the nozzle section 12 shows a partitioning into numbered droplet regions 16A, 16B, 16C and 16D above the ejection region 13. The droplet regions are defined as follows. First droplet region 16A, including the sedimentation region 14, is defined as including all particles being one droplet away from the ejection region 13. Further droplet regions 16B, 16C, 16D are defined as including all particles being two, three or four droplets away from the ejection region 13. In other words, by dispensing two (m=2) droplets, the contents of the ejection region 13 and the first droplet region 16A can be emptied to a collection reservoir or one particle can be shifted from the second droplet region 16B to the ejection region 13. Alternatively, the number of droplets to be discarded in step S10 can be determined by tracking particles in the nozzle section 12 during dispensing droplets in the mapping step S3, determining the particle displacement per dispensing step and determining the number of droplets to be discarded by dividing the axial length of the nozzle section that is free of particles by the particle displacement per dispensing step.

Figure 6:
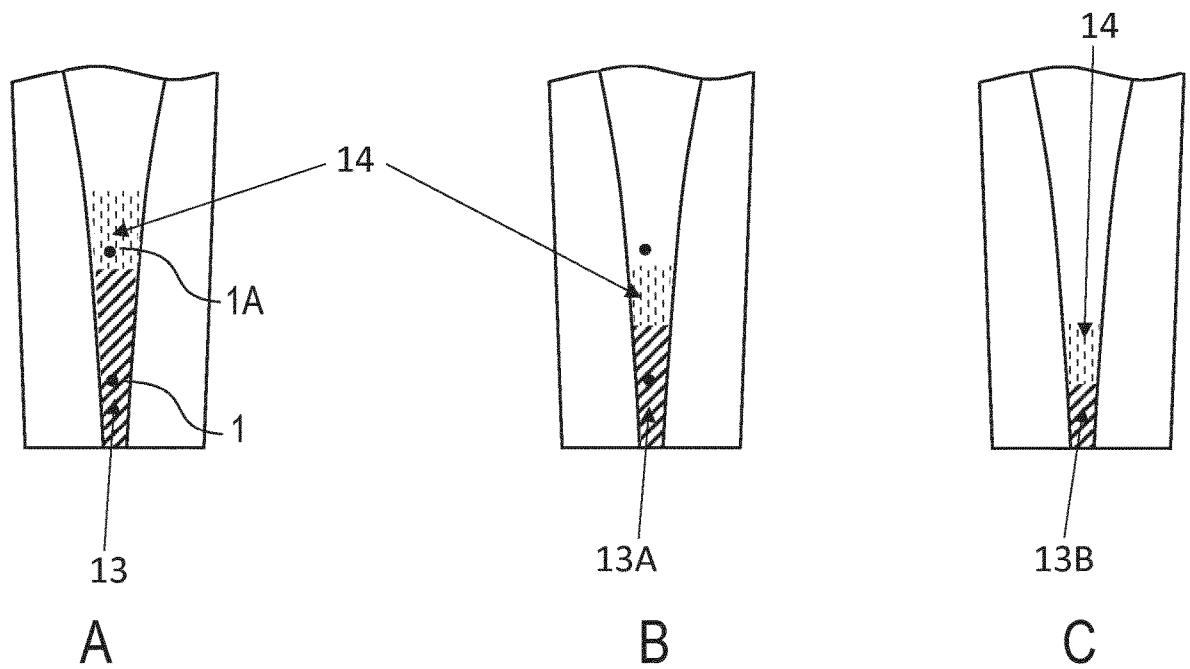
FIG. 6: a schematic cross-sectional illustration of defining ejection region subsections.

If the single particle condition (test in step S6) with the first ejection region is not fulfilled, testing the single particle condition can be modified as described in the following with reference to FIGS. 6 and 7. A considered size of the ejection region 13 is reduced to an ejection region subsection 13A or 13B, and it is determined whether the current ejection region subsection 13A or 13B includes one single particle 1 and the sedimentation region 14 adjacent to the current ejection region subsection 13A or 13B is free of particles. FIG. 6A shows (like FIG. 3) the first ejection region 13 with the particle 1 and the sedimentation region 14 with another particle 1A. In this case, the single particle condition would not be fulfilled. However, by reducing the size of the considered ejection region, the particle 1 can be dispensed as a single particle with a fractional droplet. FIGS. 6B and 6C show corresponding ejection region subsections 13A and 13B with reduced sizes, each with the sedimentation region 14. Due to the above definition of the sedimentation region 14, it has the same thickness in all three cases. Subsequently, the step of operating the droplet dispenser 10 includes setting a fractional droplet volume and dispensing a fractional droplet having a fraction of the first droplet volume onto the target 2, if the single particle condition is fulfilled with the current ejection region subsection (e. g. FIG. 6B).

Details of this extended testing of the single particle condition are shown in the flow chart of FIG. 7. Steps S1, S2, S4, S5, S6, S8, S12 and S13 are conducted as described above with reference to FIG. 1. Testing the zero particle condition and the particle type condition are not shown in FIG. 7, but can be implemented like in FIG. 1. Additionally, the PDC mapping step S3 is modified and further steps of testing the single particle condition with reduced ejection regions are provided as described in the following.

With the PDC mapping step S3, three different ejection zones (ejection zone and ejection region subsections) are considered like with step S3 in FIG. 1, wherein the first ejection region is the ejection region 13 tested with the regular droplet size and the second and third ejection regions correspondingly are ejection region subsections 13A, 13B (see FIG. 6) with reduced volumes (or axial lengths along dispenser extension). Each of the first, second and third ejection regions corresponds to a predetermined droplet size. In particular, the first ejection region 13 corresponds to the first droplet volume, and the second and third ejection regions correspond to fractional droplets having reduced volumes. With a practical example, the first droplet volume is 600 picoliter (pi), while the fractional droplets have reduced volumes of about 300 pl and about 150 pl. Furthermore, the PDC mapping step S3 includes calculating the sedimentation region 14. As a result of the mapping step, the extensions of the first, second and third ejection regions and the sedimentation regions as well as the volumes of the first, second and third droplets are stored in the testing unit 50 (see FIG. 2).

After acquiring the dispenser image with step S5, the single particle condition is tested like in FIG. 1 with the first ejection region 13 (step S6). If the single particle condition is fulfilled, the process continues with steps S8, S12 and S13. If the single particle condition is not fulfilled, a first particle distribution test (step S6.1) is conducted. If a single particle is detected in the first ejection region 13 and at least one particle is detected in sedimentation region 14 or if multiple particles are detected in the first ejection region 13, the first ejection region subsection 13A is applied (step S6.2). Otherwise, the droplet with the first droplet volume is discarded (step 11.1).

After step S6.2, the single particle condition is tested with the first ejection region subsection 13A like in FIG. 1 (step S6.3). If the single particle condition is fulfilled, i.e. there is no particle in sedimentation region 14 and one single particle in the first ejection region subsection 13A (see FIG. 6B), the process continues with steps S8.1, S12 and S13. Otherwise, if the single particle condition is not fulfilled, a second particle distribution test (step S6.4) is conducted.

The second particle distribution test (step S6.4) includes testing whether a single particle is detected in the first ejection region subsection 13A and at least one particle is detected in the sedimentation region 14 or whether multiple particle are detected in the first ejection region subsection 13A. If yes, the second ejection region subsection 13B is applied (step S6.5). Otherwise, the droplet with the volume corresponding to ejection region 13A is discarded (step 11.2).

After step S6.5, the single particle condition is tested again with the second ejection region subsection 13B like in FIG. 1 (step S6.6). If the single particle condition is fulfilled, i.e. there is no particle in sedimentation region and one single particle in the second ejection region subsection 13B, the process continues with steps S8.2, S12 and S13. Otherwise, the droplet with the volume corresponding to ejection region 13B is discarded (step 11.3).

Figure 8:
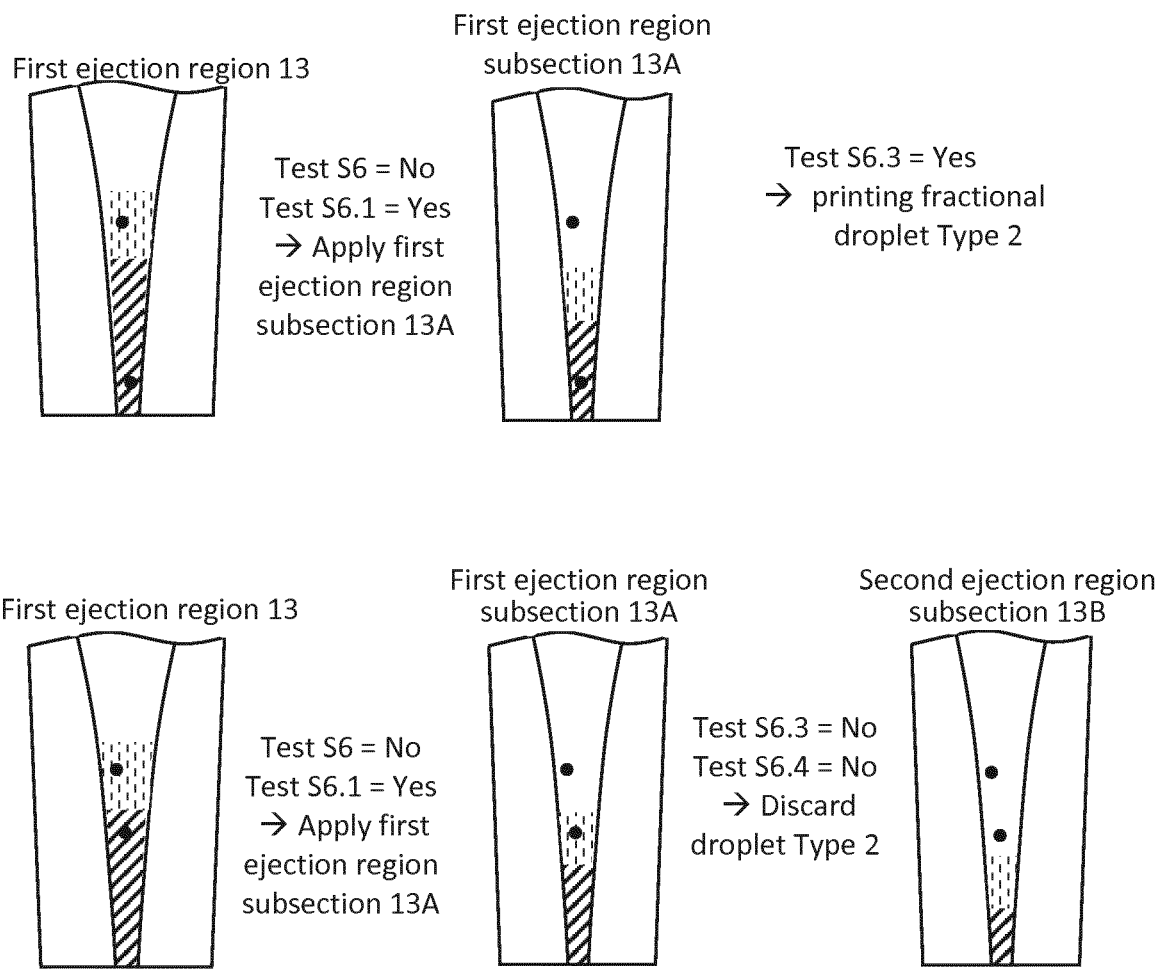
FIGS. 8 and 9: examples of particle distributions detected with the extended testing the single particle condition according to FIG. 7.
Figure 9:
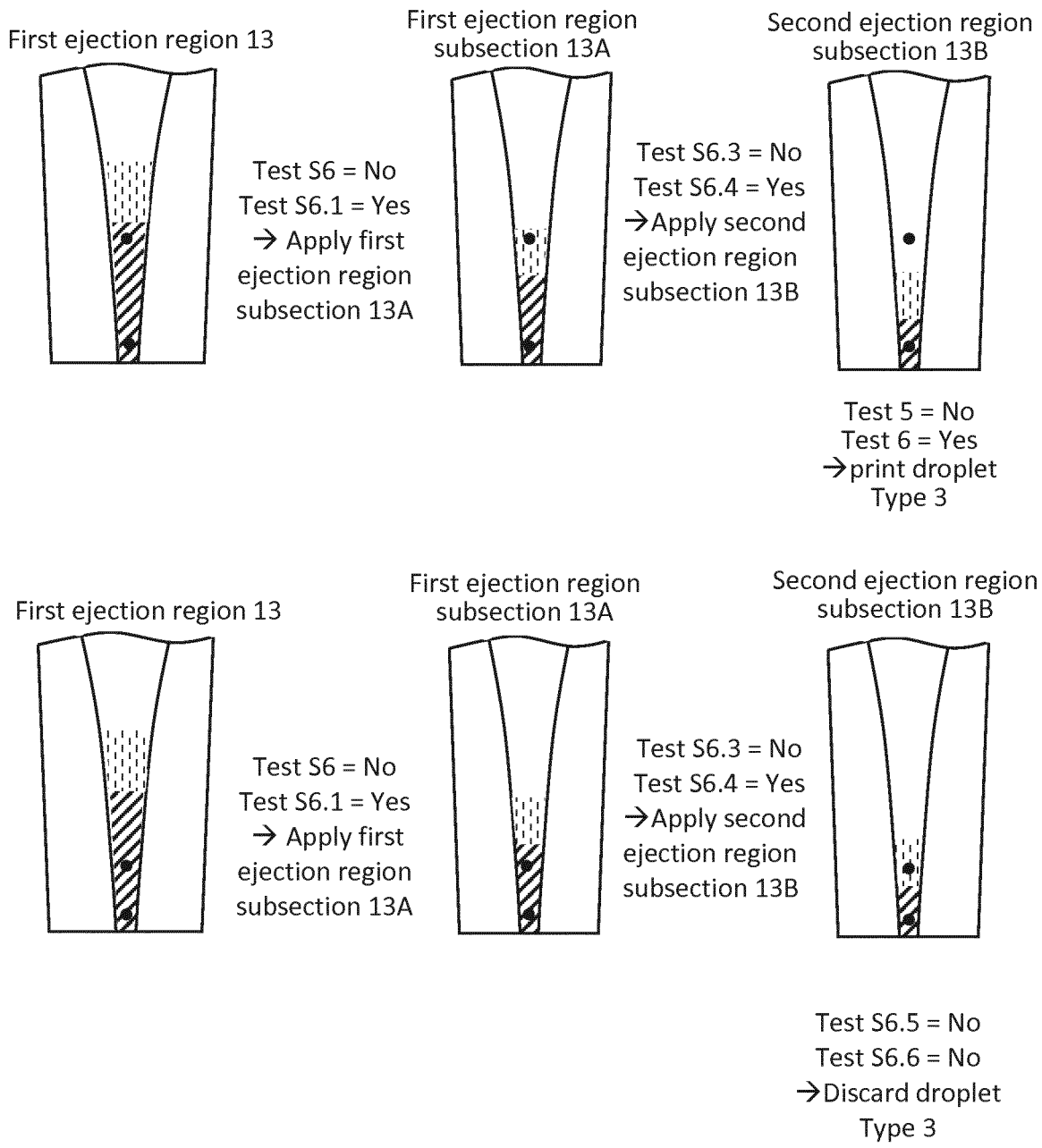

FIGS. 8 and 9 show examples of particle distributions detected with the extended testing of the single particle condition according to FIG. 7, wherein particles are detected in the sedimentation region 14 (FIG. 8) or multiple particles are detected in the ejection region or ejection region subsection 13, 13A or 13B (FIG. 9). An advantage of the invention can be seen in particular in FIG. 8 (top): In the event where a single particle was present in the ejection region, but another particle was present in the sedimentation region, applying an ejection region subsection allow displacement of the sedimentation region which in turn now allow fulfilment of the single cell condition using this ejection region subsection. This insures that most of the cells present in a sample are successfully isolated as single particles (and not anymore discarded). This is particularly important when working with limited samples containing few particles in order to maximise single particle isolation yields Details of testing the particle type condition (step S7 in FIG. 1) are shown in the flow chart of FIG. 10. Steps S1 to S4, S5, S6, S8, S12 and S13 are conducted as described above with reference to FIG. 1. Testing the zero particle condition is not shown in FIG. 10, but can be implemented like in FIG. 1. For testing the particle type condition, further steps of defining particle types and targets or target positions are added, e. g. after loading the particles into the PDC, and further test steps are provided as described in the following.

After loading the particles into the PDC (step S4), particle types are defined in step S4.1. The particle types are indicated e. g. with "a", "b", "c" etc., and they are specified e. g. by the size, shape, marker substance or function of a biological cell. In practical examples, the following particle types can be defined. Particle type a can have a diameter from 4 to 9 µm, and while particle type b can have a diameter from 9 to 35 µm, and/or particle types a and b can correspondingly comprise fluorescent and non-fluorescent particles. The particle types can be differentiated e. g. in a nozzle camera image. At least one of the particle types is a particle type of interest, which e. g. is to be enriched or sorted on a target. Furthermore, specific targets or target positions are defined for each of the particle types in step S4.2. It is noted that the steps S4.1 and S4.2 alternatively can be implemented at another phase of the process. For examples, the particle types and associated targets or target positions can be prestored in the testing unit 50.

After acquiring an image of the nozzle section (step S5), step S6 includes the test of the single particle condition as described above with reference to FIG. 1 or 7. If no particle is detected in the sedimentation region 14 and one single particle is detected in the ejection region 13, the process goes forward to step S7.1. Otherwise, one droplet is discarded.

Step S7.1 includes determining the particle type of the detected particle. Subsequently, it is tested whether the detected particle in the ejection region 13 has the at least one particle type of interest (step S7.2). If the particle type condition is not fulfilled, i.e. there is no particle of interest, the droplet including the particle, which is not of interest, is discarded (step S11). Otherwise, if the particle type condition is fulfilled, i.e. the particle is to be dispensed, the process goes forward to step S8.

With step S8, the dispenser 10 is moved to the target or target position, where the particle with the detected particle type is to be deposited. With preferred examples, particles with different types of interest can be sorted to different targets or target positions.

Testing the particle type condition according to FIG. 10 can be modified, e. g. by conducting the test of step S7.2 before testing the single particle condition (step S6), or both test can be combined.

Advantageously, the invention has a broad range of applications in particle handling. Examples of applications are summarized in the following.

In particular, particle type selection using particle type condition (see e. g. step S7 in FIG. 1) can be used for processing a sample containing a mixture of two cell populations with different diameters, for example population 1 has diameters from 2 to 5 µm and population 2 has diameters from 5 to 12 µm. With the invention, different particles can be isolated at different positions onto the target in order to facilitate different analyses to be carried out on the two different populations. Furthermore, if only one of the population is of interest, all particles corresponding to the other population can be discarded in order to only isolate single particle of the population of interest. As a further alternative, enriching one population can be provided. If all particles from the population of interest are sorted at the same target position and all other particles are discarded, then a single pure/enriched population is obtained. Furthermore, sorting two particle populations can be obtained. If only two targets are used, i.e. one for each population then such an approach can be used for sorting two populations in order to obtain two pure populations.

As a further example, using multiple discarding of droplets (see e. g. FIG. 4) for moving single particles inside the dispenser ejection zone allows a drastic increase of the speed of particle processing, and this has particular advantages when working with highly diluted samples containing few particles.

Setting fractional droplet volumes (see e. g. FIG. 7) for having multiple ejection region subsections has particular advantages when working with samples containing few cells of high interest. With more details, this approach allows an increase in the proportion of single particle successfully isolated in order to ensure no particle are lost. For example, practical tests have shown over 97% of cells present in a cerebrospinal fluid sample being successfully isolated as single cells.

The features of the invention disclosed in the above description, the drawings and the claims can be of significance both individually as well as in combination or sub-combination for the realization of the invention in its various embodiments.

The invention claimed is:

1. A method of depositing single particles via a droplet dispenser onto a target, wherein the droplet dispenser has a suspension reservoir and a nozzle having an ejection region and a sedimentation region upstream the ejection region, the droplet dispenser being capable of dispensing operation wherein a particle suspension having the particles flows from the suspension reservoir through the nozzle towards a terminal opening of the nozzle at the ejection region and droplets of the particle suspension are dispensed through the terminal opening to the target, nozzle camera is arranged for a particle detection including detecting particles in the particle suspension within the nozzle, a controller is arranged in electronic communication with the nozzle camera and with a testing unit including an image data storage for storing image data of the ejection region and the sedimentation region; the method comprising:
 loading the particle suspension having the particles to the droplet dispenser having the suspension reservoir and the nozzle, wherein the droplet dispenser is capable of dispensing droplets having the particle suspension at a first droplet volume;
 detecting a presence of the particles in the particle suspension in the nozzle via the nozzle camera;
 controlling the droplet via the controller dispenser based on a test procedure, which includes
 (i) testing a single particle condition of the droplet dispenser via the testing unit to determine the single particle condition is fulfilled when an ejection region of the nozzle adjacent the terminal opening includes one single particle of the particles and the sedimentation region adjacent to and upstream the ejection region is free of the particles, wherein in the sedimentation region the particles are displaced to the ejection region by sedimentation between the step of detecting the presence of the particles and the step of controlling the droplet dispenser, and
 (ii) testing at least one of a zero particle condition of the droplet dispenser via the testing unit to determine the zero particle condition is fulfilled when a volume equal to or larger than a 2-fold volume of the ejection region beginning at a tip of the nozzle to the sedimentation region is free of particles to be dispensed, and a particle type condition via the testing unit to determine the particle type condition is fulfilled when the detected particles have a predetermined particle type identified by at least one of size, shape, colour emission and absorption; and
 operating the droplet dispenser via the controller, wherein, in accordance with the testing determinations of
 (i) the single particle condition, and
 (ii) at least one of the zero particle condition and the particle type condition, one of the droplets is dispensed from the droplet dispenser onto the target or at least one of the droplets is discarded from the droplet dispenser into a collection reservoir.

2. The method according to claim 1, wherein the step of testing the zero particle condition is conducted when the single particle condition is not fulfilled, and includes
- determining the zero particle condition is fulfiled when the volume of the droplet dispenser is free of the particles, wherein
- the step of operating the droplet dispenser includes discarding at least two droplets from the droplet dispenser when the zero particle condition is fulfilled, and discarding one droplet from the droplet dispenser when the zero particle condition is not fulfilled.

3. The method according to claim 2, wherein
when one of the particles is detected within the volume of the droplet dispenser, the step of operating the droplet dispenser includes discarding a number of the droplets from the droplet dispenser required for moving the detected particle from the position within the ejection region.

4. The method according to claim 3, wherein
the controller determines the number of droplets to be discarded during the controlling the droplet dispenser step by tracking particles in the nozzle during dispensing droplets, determining a particle displacement per dispensing step and determining the number of droplets to be discarded by dividing the volume that is free of particles by the particle displacement per dispensing step.

5. The method according to claim 3, wherein
a number of droplets to be discarded is determined via the controller by partitioning the nozzle into droplet regions being numbered according to the number of droplets required for moving one of the detected particles from the respective droplet region to the ejection region, and determining the number of the droplet region of the one detected particle.

6. The method according to claim 2, wherein
the predetermined volume has an axial length along the nozzle equal to a field of view of the nozzle camera used for testing the zero particle condition.

7. The method according to claim 1, wherein, when the single particle condition within the ejection region is not fulfilled, testing the single particle condition further includes
- reducing the ejection region in size to an ejection region subsection and determining whether the ejection region subsection includes one single particle and the sedimentation region adjacent to the ejection region subsection is free of particles, wherein
- the step of controlling the droplet dispenser includes dispensing a fractional droplet having a fraction of the first droplet volume onto the target when the single particle condition is fulfilled with the ejection region subsection.

8. The method according to claim 7, wherein, when the single particle condition within the ejection region subsection is not fulfilled, testing the single particle condition further includes
- reducing the ejection region subsection in size and testing the single particle condition with the reduced ejection region subsection.

9. The method according to claim 7, wherein
the step of testing a single particle condition of the droplet dispenser ejection subjection includes testing a plurality of ejection region subsections, each having a different size.

10. The method according to claim 7, wherein
the fraction of the first droplet volume is determined by the controller according to the position of the single particle in the ejection region subsection.

11. The method according to claim 1, wherein the step of testing the particle type condition via the testing unit includes
- defining types of particles in the droplet dispenser by at least one of size, shape, colour emission and absorption, and
- testing whether the particle in the ejection region is the predetermined particle type, wherein
- the step of controlling the droplet dispenser via the controller includes dispensing a droplet including the particle having the predetermined particle type onto the target or discarding the droplet into the collection reservoir.

12. The method according to claim 11, wherein
the particles include at least two particle types of interest,
the step of testing the particle type condition includes determining the particle type of a particle in the ejection region or ejection region subsection, and
the step of operating the droplet dispenser includes dispensing a droplet at a target position selected based on the predetermined particle type particle in the ejection region or an ejection region subsection.

13. The method according to claim 12, wherein
the step of operating the droplet dispenser includes dispensing droplets from the nozzle on different targets based on different particle types.

14. The method according to claim 11, wherein
the particles include one particle type of interest,
the step of testing the particle type condition includes determining the particle type of a particle in the ejection region or an ejection region subsection, and
if the determined particle type of the particle in the ejection region or the ejection region subsection is the particle type of interest or not, the step of controlling the droplet dispenser correspondingly includes dispensing a droplet at a target position or discarding a droplet.

15. A method of depositing single particles via a droplet dispenser onto a target, wherein the droplet dispenser has a suspension reservoir and a nozzle having an ejection region and a sedimentation region upstream the ejection region, the droplet dispenser being capable of a dispensing operation wherein a particle suspension having the particles flows from the suspension reservoir through the nozzle towards a terminal opening of the nozzle at the ejection region and droplets of the particle suspension are dispensed through the terminal opening to the target, a nozzle camera is arranged for a particle detection including detecting particles in the particle suspension within the nozzle, a controller is arranged in electronic communication with the nozzle camera and with a testing unit including an image data storage for storing image data of an ejection region and a sedimentation region the method comprising:
- loading the particle suspension having the particles to the droplet dispenser having the suspension reservoir and the nozzle, wherein the droplet dispenser is capable of dispensing droplets having the particle suspension at a first droplet volume;
- detecting a presence of the particles in the particle suspension the nozzle via a nozzle camera;
- controlling the droplet dispenser via the controller based on a test procedure, which is capable of testing a single particle condition of the droplet dispenser via a testing unite to determine the single particle condition is fulfilled when an ejection region of the nozzle includes one single particle of the particles and eth sedimentation region adjacent to and upstream the ejection region is free the particles, wherein in the sedimentation region the particles are displaced to the ejection region by sedimentation between the step of detecting the presence of the particles and a step of controlling the droplet dispenser; and operating the droplet dispenser via the controller, wherein, in dependency on the single particle condition fulfilment, one of the droplets is dispensed from the droplet dispenser onto the target or at least one of the droplets is discarded from the droplet dispenser into a collection reservoir, wherein when the step of testing the single particle condition with the ejection region is not fulfilled, testing the single particle condition further includes reducing the ejection region according to an ejection region subsection and determining whether a current ejection region subsection includes one single particle and the sedimentation region adjacent to the current ejection region subsection is free of particles, and dispensing a fractional droplet having a fraction of the first droplet volume onto the target if the single particle condition is fulfilled with the current ejection region subsection.

16. The method according to claim 15, wherein, if the step of testing the single particle condition with the ejection region subsection is not fulfilled, testing the single particle condition further includes further reducing the ejection region and testing the single particle condition with the further reduced ejection region subsection.

17. The method according to claim 15, wherein the fraction of the first droplet volume is obtained by determining the position of the single particle in the ejection region subsection and estimating the fractional droplet volume based on the particle position in a mapping step.

18. A dispenser apparatus, being adapted for dispensing droplets including single particles onto a target, comprising:

at least one droplet dispenser having a suspension reservoir and a nozzle configured to include a particle suspension, an ejection region and a sedimentation region upstream of the ejection region;

a dispenser head arranged for carrying the at least one droplet dispenser;

a nozzle camera arranged for detecting particles in the nozzle;

a control device arranged electrical communication with the nozzle camera and for controlling the at least one droplet dispenser; and a testing unit coupled with the nozzle camera and with the control device and being adapted for (i) testing a single particle condition of the droplet dispenser, wherein during testing it is determined whether the ejection region of the nozzle includes one single particle and the sedimentation region adjacent to the ejection region is free of particles, wherein in the sedimentation region the particles are displaced to the ejection region by sedimentation during an operation delay interval between a step of detecting the presence of particles and a step of operating the droplet dispenser, and (ii) testing at least one of a zero particle condition of the droplet dispenser, wherein it is determined whether a predetermined volume equal to or larger than a 2-fold volume of the ejection region beginning at a tip of the nozzle of the droplet dispenser to the sedimentation region is free of particles to be dispensed, and a particle type condition, wherein it is determined whether detected particles have a predetermined particle type identified by at least one of size, shape, colour emission and absorption, wherein the control device is adapted for controlling the droplet dispenser based on the single particle condition, at least one of the zero particle condition and the particle type condition, a droplet is dispensed onto the target or discarded into a collection reservoir.

19. The dispenser apparatus according to claim 18, wherein the testing unit includes an image data storage being adapted for storing image data of the ejection region and the sedimentation region.

* * * * *